United States Patent [19]

Akebi et al.

[11] Patent Number: 5,496,974
[45] Date of Patent: Mar. 5, 1996

[54] APPARATUS FOR DETECTING THE COORDINATE POSITION OF A CONTACT POINT ON TOUCH PANEL

[75] Inventors: Kazuhiko Akebi; Kensuke Taki, both of Moriyama, Japan

[73] Assignee: Gunze Limited, Ayabe, Japan

[21] Appl. No.: 238,844

[22] Filed: May 6, 1994

[30] Foreign Application Priority Data

May 11, 1993 [JP] Japan .................................. 5-109389

[51] Int. Cl.$^6$ ................................................. G08C 21/00
[52] U.S. Cl. ................................................. 178/20; 345/174
[58] Field of Search ..................... 178/19, 20; 345/173, 345/174

[56] References Cited

U.S. PATENT DOCUMENTS 4,306,110 12/1981 Nelson et al. .
5,072,076 12/1991 Camp, Jr. .............................. 178/20 X
5,245,139 9/1993 Protheroe et al. ..................... 178/20 X

FOREIGN PATENT DOCUMENTS 4-33015 2/1992 Japan .
4-352219 12/1992 Japan .

Primary Examiner—Stephen Chin
Assistant Examiner—Paul Loomis
Attorney, Agent, or Firm—Armstrong, Westerman, Hattori, McLeland & Naughton

[57] ABSTRACT

In an apparatus for detecting a coordinate position of a contact point in a touch panel, a resistance layer having a pair of electrodes opposed in a X direction and another resistance layer having a pair of electrodes opposed in a Y direction are opposed in a Z direction. The apparatus includes the following units. A unit for applying a voltage to the pair of electrodes of one resistance layer when the apparatus is in an input stand-by state. A resistance connecting an electrode of the other resistance layer to earth when the apparatus is in the input stand-by state. A unit for detecting a voltage induced to the other electrode of the other resistance layer when the resistance layers contact with each other in an event of a depressing operation. A unit for controlling the transition from the input stand-by state to another state in which an operation for detecting the coordination position is executed, when the voltage is induced to the other electrode of the other resistance layer.

5 Claims, 5 Drawing Sheets

APPARATUS FOR DETECTING THE COORDINATE POSITION OF A CONTACT POINT ON TOUCH PANEL

BACKGROUND OF THE INVENTION

1. Field of the Invention

The present invention relates to an apparatus for detecting the coordinate position of a contact point on a resistance layer type touch panel.

2. Related Arts

The touch panels of this type are composed of two resistance layers opposed to each other and separated by a certain gap. One resistance layer has a pair of electrodes disposed on its edges to be opposed in a X direction and the other resistance layer has a pair of electrodes disposed on its edges to be opposed in a Y direction. These resistance layers are alternately charged with electric current through their electrodes to measure a voltage induced to the resistance layer that is not being charged with the electric current. The coordinate position (x and y) of a contact point on the touch panels is detected by measuring the induced voltage.

Such alternate supply of electric current to the resistance layers during input stand-by periods wastes electric power. Therefore, the touch panels of this type are so designed that the electric current supply to these resistance layers is suspended during the input stand-by periods and an occurrence of a depressing operation is automatically detected.

An example of such touch panels is described in Japanese Laid-open Patent Application No. 4-352219. According to the touch panel of the example, as shown in FIG. 1A, a pair of rectangular resistance layers 21 and 22 are disposed to be opposite each other with a certain gap therebetween. The resistance layer 22 is provided with a pair of electrodes a2 and a3 disposed at its edges to be opposed in a X direction. The other resistance layer 21 is provided with a pair of electrodes a1 and a4 disposed at its edges to be opposed in a Y direction which is perpendicular to the X direction. Each of the electrodes a1 and a3 is connected with a respective power source Vcc having a fixed voltage via a transistor Tr1 and Tr3 respectively. Each of the electrodes a2 and a4 is earthed via a transistor Tr2 and Tr4 respectively, and the voltage fluctuations of these electrodes a4 and a2 are indicated respectively as a position detection signal $V_x$ in X direction and a position detection signal $V_y$ in Y direction. In the input stand-by periods, all the transistors Tr1–Tr4 are put in an off-state and the anode of a diode D is set in a high level, thereby realizing an equivalent circuit shown in FIG. 1B.

In the equivalent circuit, as soon as the two resistance layers 21 and 22 contact with each other at a contact point as a result of being depressed, electric current is supplied to the resistance layers 21 and 22 and a resistance R down to the ground. As a result, the voltage level of the electrode a2 is changed, so that a control unit (not shown) can detect an occurrence of a depressing operation. After the detection, the control unit controls the alternate supply of electric current between the transistors Tr1 and Tr4 for the resistance layer 21 and the transistors Tr2 and Tr3 for the resistance layer 22.

However, these conventional touch panels have a problem as follows. The level of a voltage to be induced to the electrode a2 greatly differs depending on a depressed point during the input stand-by periods in addition to the contact resistance between the resistance layers 21 and 22. These conditions make it extremely difficult to detect an occurrence of a depressing operation.

For example, when a point in the neighborhood of the electrode a1 of the resistance layer 21 and in the neighborhood of the electrode a2 of the resistance layer 22 is depressed and as a result, these resistance layers 21 and 22 contact with each other, a value of a voltage (Va2) induced to the electrode a2 is given by:

$$Va2 = \frac{R}{r+R} * Vcc \qquad (1)$$

where r is a contact resistance between the resistance layers 21 and 22.

On the other hand, when a point in the neighborhood of the electrode a3 of the resistance layer 22 and in the neighborhood of the electrode a4 of the resistance layer 21 is depressed, the value of voltage (Va2) is given by:

$$Va2 = \frac{R}{R_{21} + R_{22} + r + R} * Vcc \qquad (2)$$

where $R_{21}$ is a resistance value between the electrodes a1 and a4, and $R_{22}$ is a resistance value between the electrodes a2 and a3.

Generally, these resistance values $R_{21}$ and $R_{22}$ are several hundred ohms (for example 200Ω), and the contact resistance r changes in a range between 0 and 10 kΩ in accordance with the strength of a depression.

In these equations (1) and (2), even if the contact resistance r changes in the above-mentioned range, as far as the fixed resistance R is much larger than the sum of the maximum value of the contact resistance r and the two resistance values $R_{21}$ and $R_{22}$, the detection of an occurrence of a depressing operation becomes possible.

For example, if $$R \gg r + R_{21} + R_{22} \qquad (3)$$

then, even when a depressed point is on a very edge of the resistance layer as described in the equations (1) and (2), an occurrence of the depression can be detected from the change of Va2 as follows.

$$Va2 \approx Vcc \qquad (4)$$

However, to set a large value as R is accompanied by an inconvenience as follows.

The detection of an occurrence of a depressing operation is executed even when an operator slightly touches the resistance layer without intention or when a chattering is caused before or after an actual depressing operation by a transitional vibration of either resistance layer. The chattering means, as shown in FIG. 2, that the resistance layers 21 and 22 are alternately put in a state of being in touch and the other state of being out of touch in a short cycle.

In order to solve the inconvenience, a value of the fixed resistance R must be small to some extent; however, this condition causes the voltage Va2 to greatly vary depending on a depressed point. Hence, it becomes impossible to distinguish a depressing operation in the neighborhood of the electrodes a3 and a4 from a slight touch with no intention of a depression.

SUMMARY OF THE INVENTION

In view of the foregoing problems, a main object of the present invention is to provide an apparatus for detecting the coordinate position of a contact point on a touch panel, capable of distinguishing intentional depressing operations from accidental touches during input stand-by periods, wherever a depressed point is.

As explained hereinbefore, according to the present invention, a proper threshold is set to the detection voltage in input stand-by periods, and when the detection voltage exceeds the threshold value, an operation for measuring coordinate data is started. This construction can prevent the start of the coordinate data measuring operation when there is a depression whose contact resistance is large and unstable.

In addition, the voltage applied on the pair of electrodes of one resistance layer is set in a high level, which can remarkably reduce the voltage drop in the area between the electrode and a depressed point, as compared with the case where only the voltage applied on one of the pair electrodes is set in a high level. According to this construction, detection accuracy in the input stand-by periods can be enhanced by setting a high threshold value.

Furthermore, since electric current is hardly supplied during the input stand-by periods, power consumption does not increase like the conventional touch panels.

DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

Figure 1A:
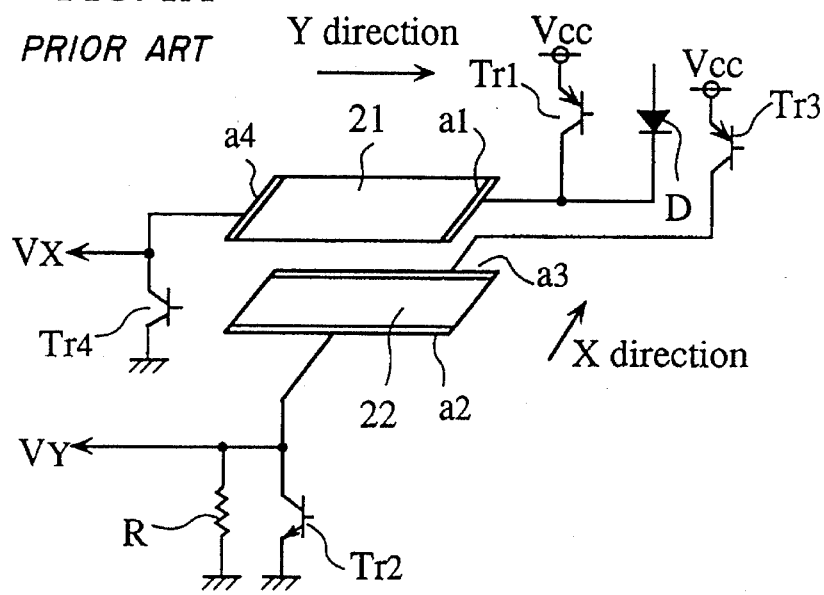
FIG. 1A is a schematic diagram showing an example of a conventional touch panel.
Figure 1B:
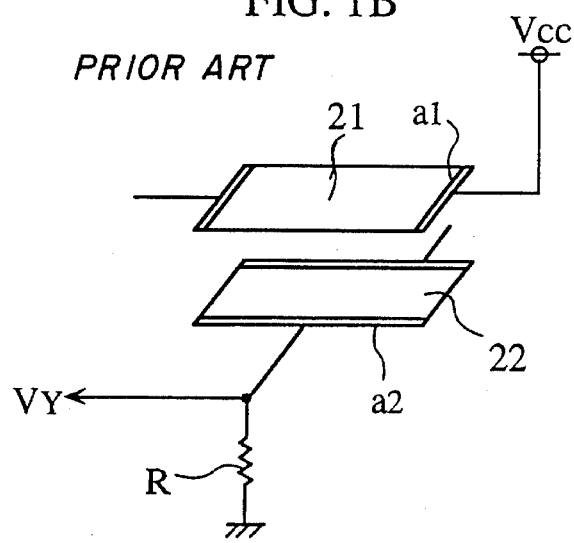
FIG. 1B is the touch panel shown in FIG. 1A in an input stand-by state.
Figure 2:
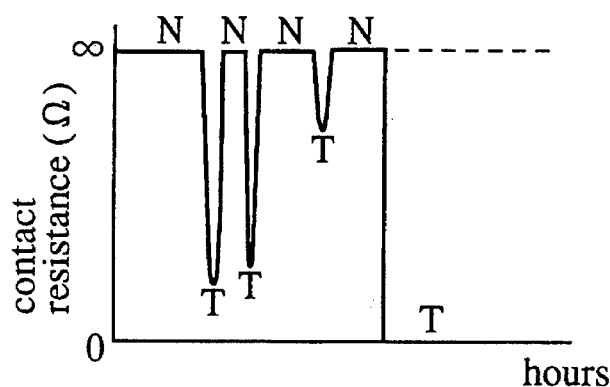
FIG. 2 is a graph showing the transition of a contact resistance value between the resistance layers during a chattering.
Figure 3:
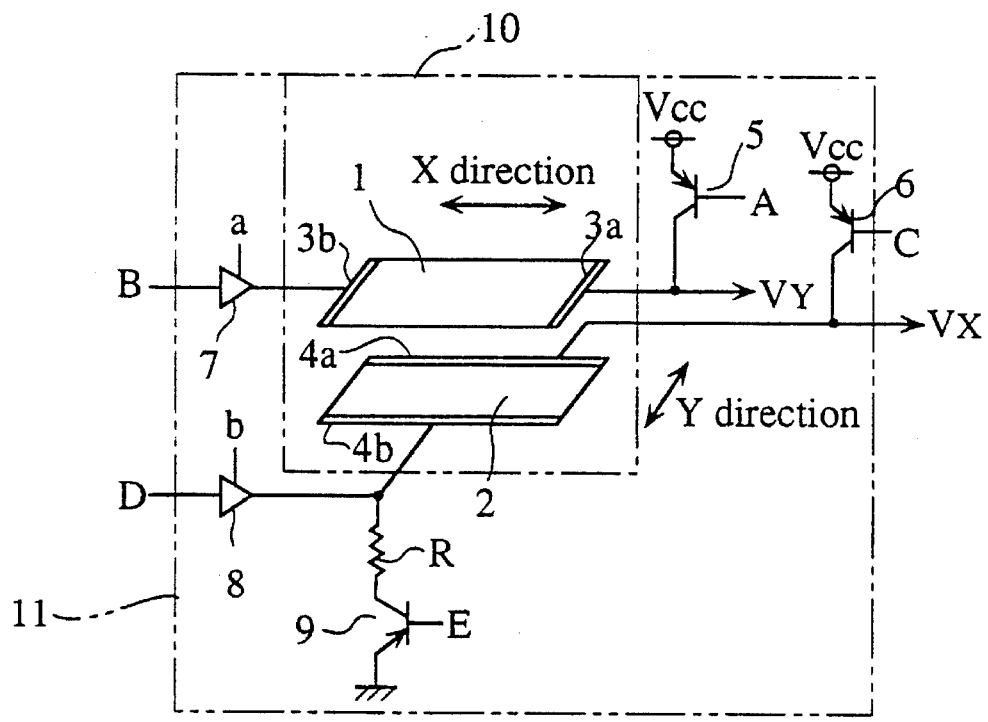
FIG. 3 is a schematic diagram showing a panel unit and a driver unit in the apparatus for detecting the coordinate position of a contact point on a touch panel according to this embodiment.

FIG. 3 is a schematic diagram showing a panel unit 10 and a driver unit 11 of the apparatus for detecting the coordinate position of a contact point on a touch panel according to this embodiment. In the panel 10, a pair of rectangular resistance layers 1 and 2 are disposed to be opposed to each other with a certain gap therebetween. The resistance layer 1 is provided with a pair of electrodes 3a and 3b disposed at its edges to be opposed in a X direction. The other resistance layer 2 is provided with a pair of electrodes 4a and 4b disposed at its edges to be opposed in a Y direction, which is perpendicular to the X direction. In the driver unit 11, each of the electrodes 3a and 4a is connected with a respective power source Vcc having a fixed voltage via a transistor 5 and 6 respectively. These electrodes 3a and 4a generate a Y direction detection voltage $V_y$ and a X direction detection voltage $V_x$ respectively when a coordinate position is detected. On the other hand, each of the electrodes 3b and 4b is connected to switching elements 7 and 8 respectively, and the electrode 4b is further earthed via a resistance R and a transistor 9.

Figure 4:
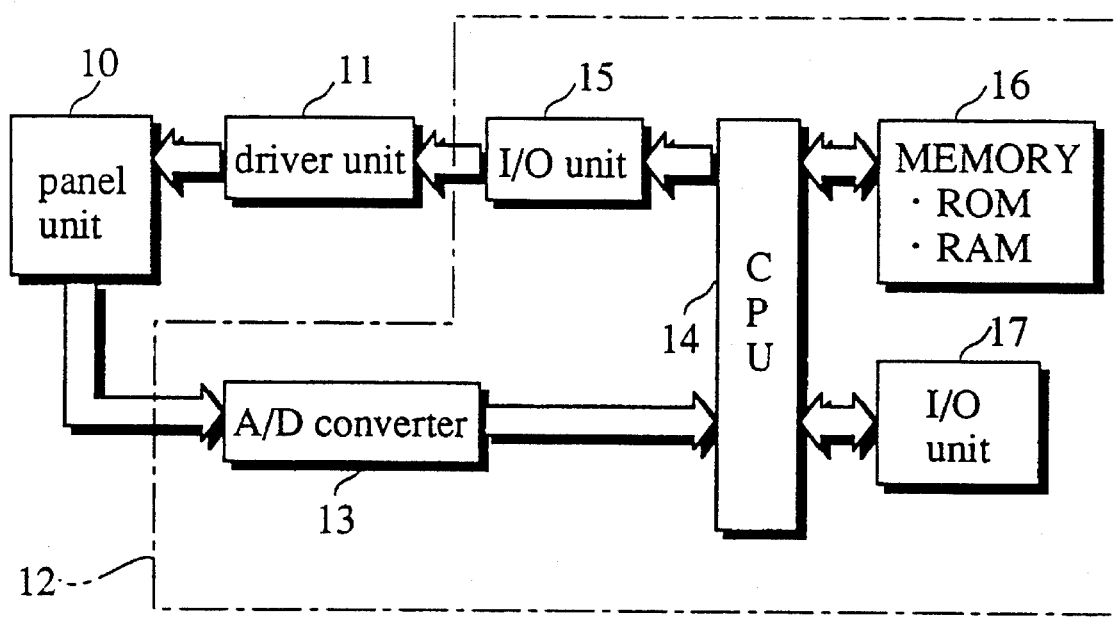
FIG. 4 is an overall construction of the apparatus shown in FIG. 3.

In FIG. 4, the detection voltage $V_x$ and $V_y$ in the panel unit 10 are sent to the control unit 12 to be converted into digital signals by the A/D conversion unit 13 and then forwarded to the CPU 14.

The driver unit 11 is controlled by the CPU 14 via the I/O unit 15. To be more specific, the high/low level of base terminals A, C, and E of the transistors 5, 6, and 9, input terminals B and D, and switch terminals a and b of switch elements 7 and 8 are controlled by the CPU 14 in accordance with each operational state. A memory 16 holds control programs and data for the CPU 14 in its ROM or RAM, and an I/O unit 17 performs data input/output operations with external apparatuses.

Figure 5A:
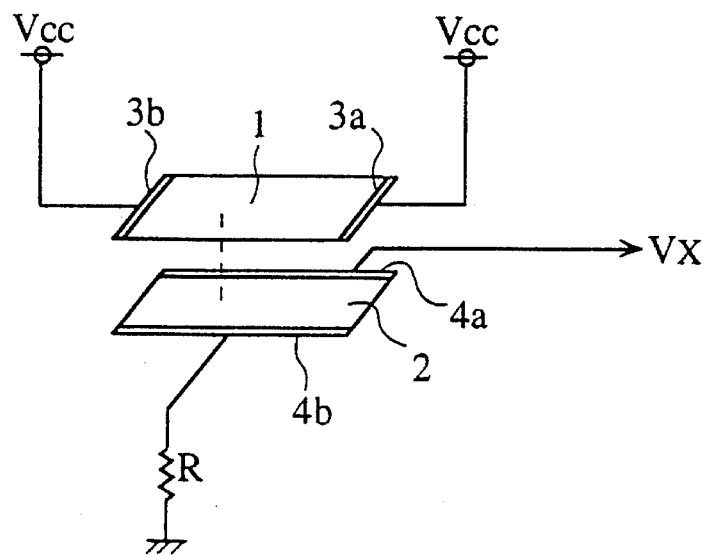
FIG. 5A is a schematic diagram showing the touch panel in input stand-by state, according to the present invention.

During the input stand-by periods, the terminals B, C, E, and a are set in high level whereas the terminals A and b are set in low level, thereby producing the state shown in FIG. 5A. To be more specific, the pair of electrodes 3a and 3b of the resistance layer 1 are set to high level (Vcc), and the electrode 4b gets earthed through the resistance R.

If the resistance layers 1 and 2 contact with each other in the direction indicated by a dot line when a point thereof is depressed, the detection voltage $V_x$ is outputted. As described below, the detection voltage $V_x$ usually becomes high level as long as the strength of depressions is substantial. The CPU 14 compares the detection voltage $V_x$ with a threshold set in the memory 16, thereby judging whether the contact of these resistance layers 1 and 2 is due to an intentional depressing operation or an accidental touch. If the detection voltage $V_x$ is higher than the threshold, the contact is judged to be due to an intentional depressing operation and the next step is taken to input data, and otherwise, the next step is not taken to exclude unreliable data.

Figure 5B:
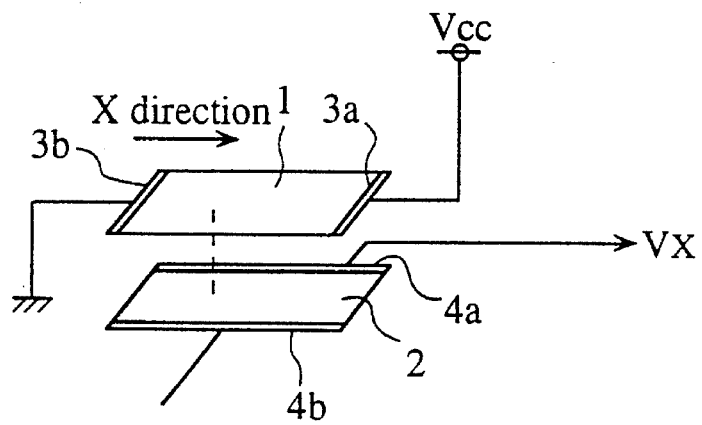
FIGS. 5B and 5C are schematic diagrams showing the detection of a voltage in the X direction and the Y direction respectively.

In order to input next coordinate data, at first, the terminals A, B, E, and b are set to low level and the terminals C and a are set to high level. As a result, the detection voltage $V_x$ corresponding to the coordinate value in the X direction is outputted as shown in FIG. 5B. To be more specific, the electrode 3a of the resistance layer 1 becomes high level (Vcc) whereas the opposite electrode 3b becomes low level (earth). As a result, the resistance layer 1 is supplied with electric current, which causes a potential gradient in the X direction, and accordingly, a voltage corresponding to the contact point in the X direction is outputted from the resistance layer 2 and its electrode 4a, as the detection voltage $V_x$.

Figure 5C:
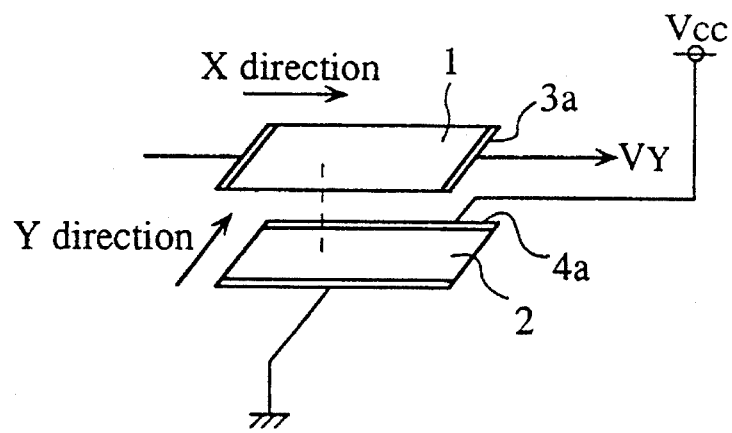

Then, the terminals A and b are set to high level whereas the terminals c, D, and a are set to low level, thereby outputting the detection voltage $V_y$ corresponding to the coordinate value in the Y direction as shown in FIG. 5C. To be more specific, the electrode 4a of the resistance layer 2 becomes high level (Vcc) whereas the opposite electrode 4b becomes low level (earth). As a result, the resistance layer 2 is supplied with electric current, which causes a potential gradient in the Y direction. Accordingly, a voltage corresponding to the contact point in the Y direction is taken out from the resistance layer 2 and its electrode 4a, and outputted as the detection voltage $V_y$.

The following is a detailed description about the judgement whether an input operation during the input stand-by periods is stable or not.

Assuming that the resistance layers 1 and 2 contact with each other while the occurrences of depressing operations are constantly observed as shown in FIG. 5A.

Figure 6A:
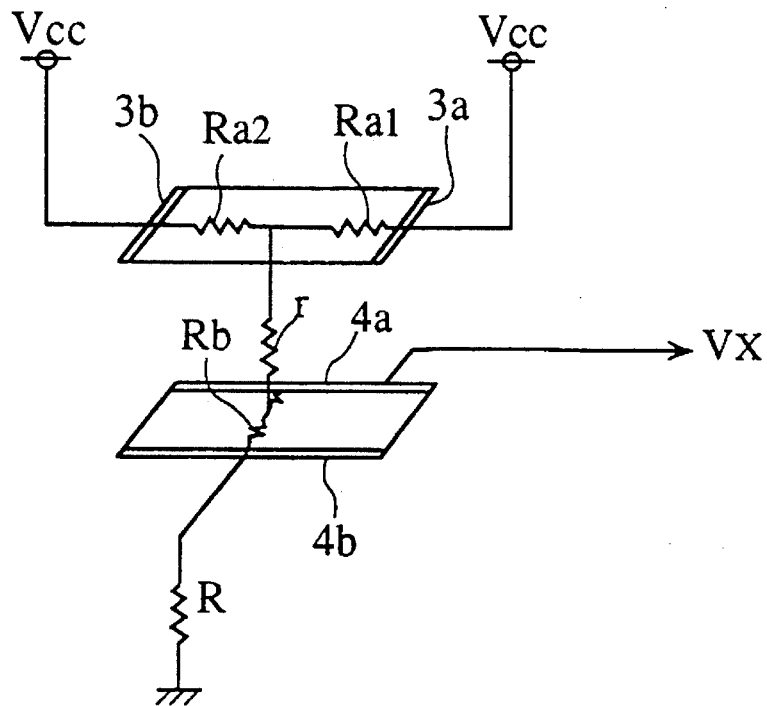
FIG. 6A is a schematic diagram showing a resistance value of each unit when there is a depressing operation during the input stand-by state according to the present invention.
Figure 6B:
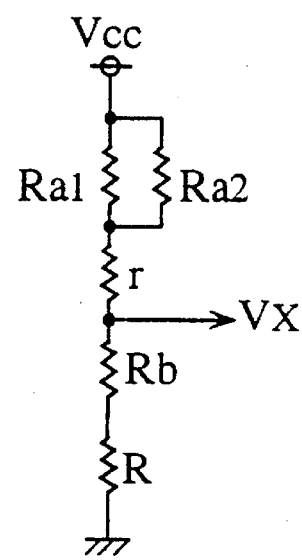
FIG. 6B is a resistance circuit to be formed when the resistance layers are in touch.
Figure 7:
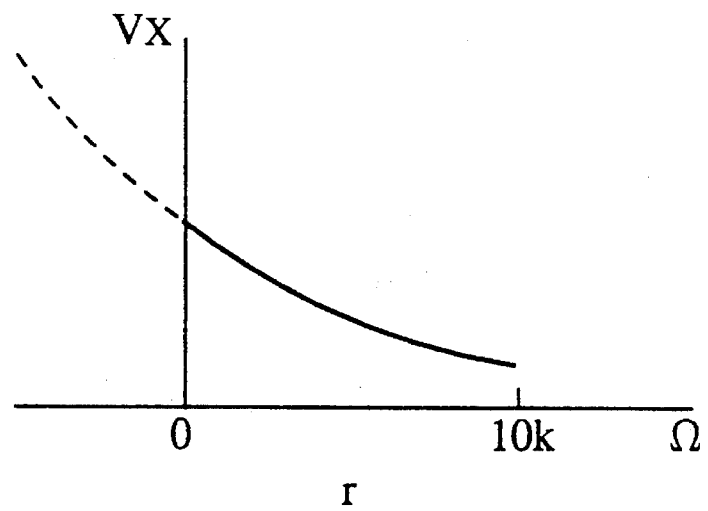
FIG. 7 is a graph showing the relationship between the contact resistance r and the detection voltage $V_x$ when a depressing operation occurs during the input stand-by state.

Assuming that the resistance of each unit is as shown in FIG. 6A, the resistance circuit shown in FIG. 6B is formed when the resistance layers contact with each other. In FIG. 6B, Ra1 and Ra2 are respectively resistance between the electrode 3a and the contact point and between the electrode 3b and the contact point on the resistance layer 1. A contact resistance r is between the resistance layers 1 and 2. Rb and R are respectively resistance between a contact point and the electrode 4b and between the electrode 4b and earth. The relationship between the contact resistance r and the detection voltage $V_x$ is shown in FIG. 7.

The detection voltage $V_x$ is given by:

$$V_x = ((R+Rb)*Vcc)/ \quad (5)$$
$$(R+Rb+r+(1/((1/Ra1)+(1+Ra2))))$$
$$= ((R+Rb)*Vcc)/$$
$$(R+Rb+r+(Ra1*Ra2)/(Ra1+Ra2))$$

A depressed point which can minimize the resistance between Vcc and the ground is in the neighborhood of the electrode 3a or 3b and also in the neighborhood of the electrode 4b. At this time, the detection voltage $V_x$ is given by:

$$V_x = \frac{R}{R+r} * Vcc \quad (6)$$

On the other hand, a depressing point which can maximize the resistance between Vcc and the ground is in the middle of the resistance layer 1 in the X direction and in the neighborhood of the electrode 4b of the resistance layer 2.

At this time, the detection voltage $V_x$ is given by:

$$V_x = \frac{R}{R+r+\frac{Ra1}{2}} * Vcc = \frac{R}{R+r+\frac{Ra}{4}} * Vcc \quad (7)$$

where Ra is resistance between the electrodes 3a and 3b of the resistance layer 1.

The voltage $V_x$ given by the equation (6) is the same as Va2 given by the equation (1) explained in Related Arts. On the other hand, the voltage $V_x$ given by the equation (7), which includes as little as ¼ of the resistance between the electrodes 3a and 3b, is apparently greater than Va2 given by the equation (2). Since the difference between the equations (7) and (6) is the presence or absence of ¼ Ra in the denominator, the detection voltage only varies within the range given in each equation (7) and (6), wherever a depressed point on the each touch panel is. Since Ra is generally around 200 Ω, the difference in each value in the denominator is around 50 Ω; however, the contact resistance r which varies between 0 and 10 kΩ greatly affects the value of the detection voltage. Hence, wherever on the touch panel is depressed during the input stand-by periods, it can be distinguished from an accidental light touch as long as the threshold for the detection voltage $V_x$ is set to a proper value, without setting a large resistance R.

The following is a description on how a proper resistance value of the resistance R is set.

When the contact resistance r varies within the range between 0 and 10 kΩ, and R'=R+R and A=Ra1+Ra2 in the equation (5), the factor K ($=V_x/Vcc$) is given by:

$$K=R'/(r+R'+A) \quad (8)$$

Therefore, $$\text{if } r=0, \text{ then } K=R'/(R'+A) \quad (9)$$

$$\text{if } r=10 \text{ k}, \text{ then } K=R'/(R'+A+10000) \quad (10)$$

If R is so set as to make the difference between the equations (9) and (10) largest, then the change in the contact resistance r can be detected most easily. Then, 0 becomes the theoretical optimum value for R. However, R is actually set around 1 KΩ because the condition R=0 may cause a short circuit to the ground, and also from a view point of the life of the resistance layers 1 and 2.

Figure 8:
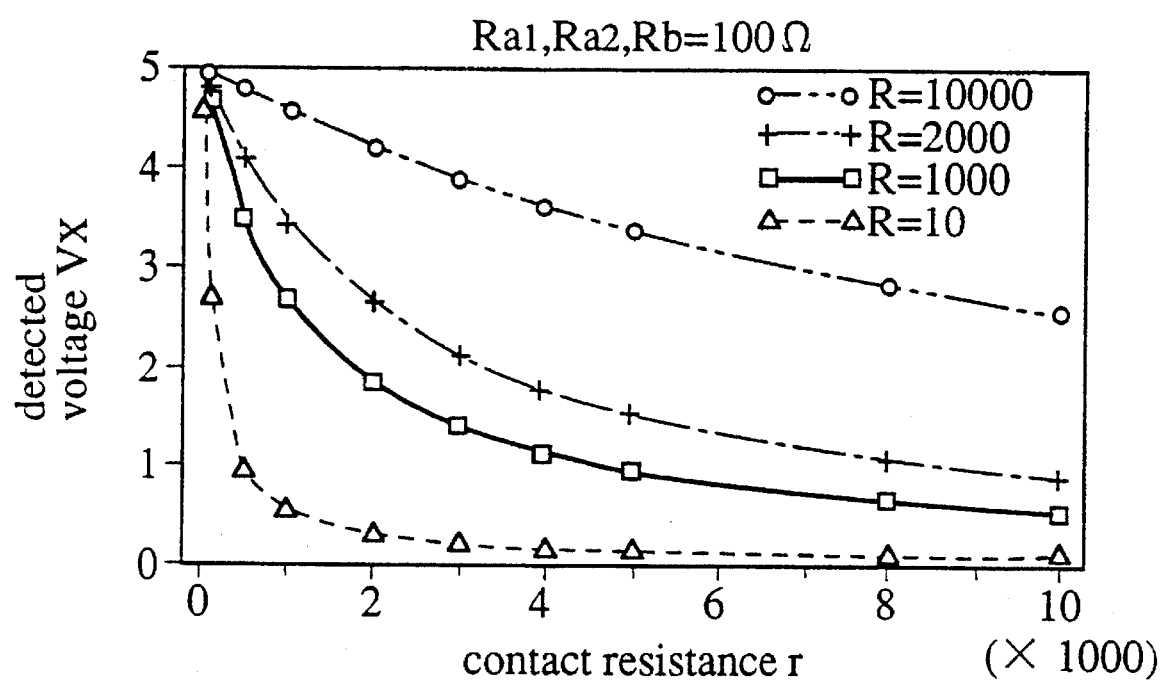
FIG. 8 is a graph showing the relationship between the contact resistance r and the detection voltage $V_x$, using resistance as a parameter, when a depressing operation occurs during the input stand-by state.

FIG. 8 is a graph showing the relationship between the contact resistance r and the detection voltage $V_x$ when Ra1, Ra2, and R are all 100 Ω, and R is either 100 Ω, 1000 Ω, 2000 Ω, or 10000 Ω.

As apparent from the graph, uncertain input can be excluded as long as the threshold for the voltage is set to a proper value, even when the resistance R is 1000 Ω. To be more specific, if the threshold is set around 4.5 V, then data is not inputted unless the depression is strong enough for the contact resistance r to reach several hundred ohms. Thus, uncertain input can be excluded without fail.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An apparatus for detecting a coordinate position of a contact point in a touch panel including a first resistance layer having first and second electrodes opposed in an X direction and a second resistance layer having first and second electrodes opposed in a Y direction, said first resistance layer and said second resistance layer being opposed in a Z direction, said apparatus comprising:

voltage application means for applying an application voltage to said first and second electrodes of said first resistance layer when said apparatus is in an input stand-by state;

resistance means for applying a resistance between one of said first electrode and second electrode of a second resistance layer and ground when said apparatus is in said input stand-by state;

voltage detection means for detecting an induced voltage induced to a remaining one of said first and second electrodes of said second resistance layer when said first resistance layer and said second resistance layer contact with each other in an event of a depressing operation; and control means for controlling a transition from said input stand-by state to another state in which an operation for detecting said coordination position is executed, when said induced voltage is induced to said remaining one of said first and second electrodes.

2. The apparatus of claim 1, wherein said voltage application means comprises a voltage source, a first switch element, and a change-over switch, said first switch element connecting said voltage source with one of said first electrode and second electrode of the first resistance layer, and said change-over switch connecting said voltage source with a remaining electrode of said first resistance layer; and said resistance means being a series circuit including a resistance element having a predetermined resistance value and a second switch element, wherein said first and second switch elements are on and said change-over switch is so shifted as to connect said voltage source with said remaining electrode of said first resistance layer when said apparatus is in said input stand-by state.

3. The apparatus of claim 2, wherein said remaining electrode of said remaining resistance layer is connected with said voltage source via a third switch element, said remaining electrode being a candidate for detecting said induced voltage by said voltage detection means, and said third switch element being off when said apparatus is in said input stand-by state.

4. The apparatus of claim 3, wherein said one of said first and second electrodes of said remaining resistance layer is connected with a terminal of said change-over switch, said one of said first and second electrodes being connected to said voltage detection means, and said change-over switch being open when said apparatus is in said input stand-by state.

5. The apparatus of claim 4, wherein said control means controls said switch elements and said change-over switch to construct a circuit in which said application voltage is applied on said first electrode and second electrode of said first resistance layer, and said resistance means is disposed between said one of said first electrode and second electrode of said second resistance layer and the ground, and another circuit in which said application voltage is alternately applied on said first resistance layer and said second resistance layer, and synchronously one of said first resistance layer and said second resistance layer which is not being applied with said application voltage is connected with the ground, thereby detecting said induced voltage induced to said remaining electrode of said second resistance layer when said apparatus is in said other state in which said operation for detecting said coordination position is executed.

* * * * *